Dec. 22, 1953     H. EPSTEIN     2,663,249
PANCAKE MAKING MACHINE

Filed March 22, 1951                                3 Sheets-Sheet 1

INVENTOR

Hyman Epstein
BY
Charles H. Brown
ATTORNEY

Dec. 22, 1953  H. EPSTEIN  2,663,249
PANCAKE MAKING MACHINE
Filed March 22, 1951  3 Sheets-Sheet 2
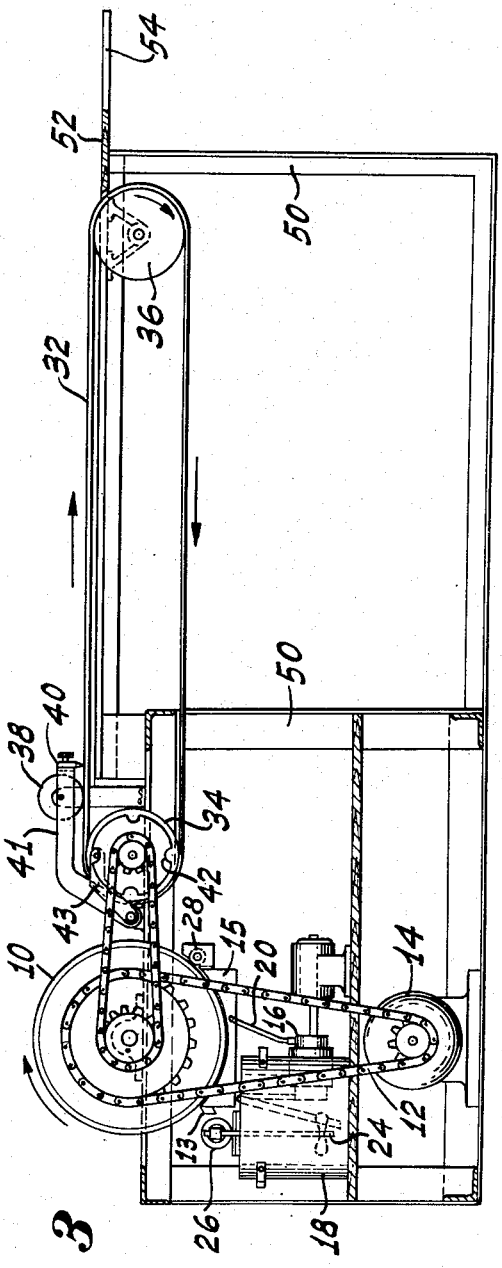
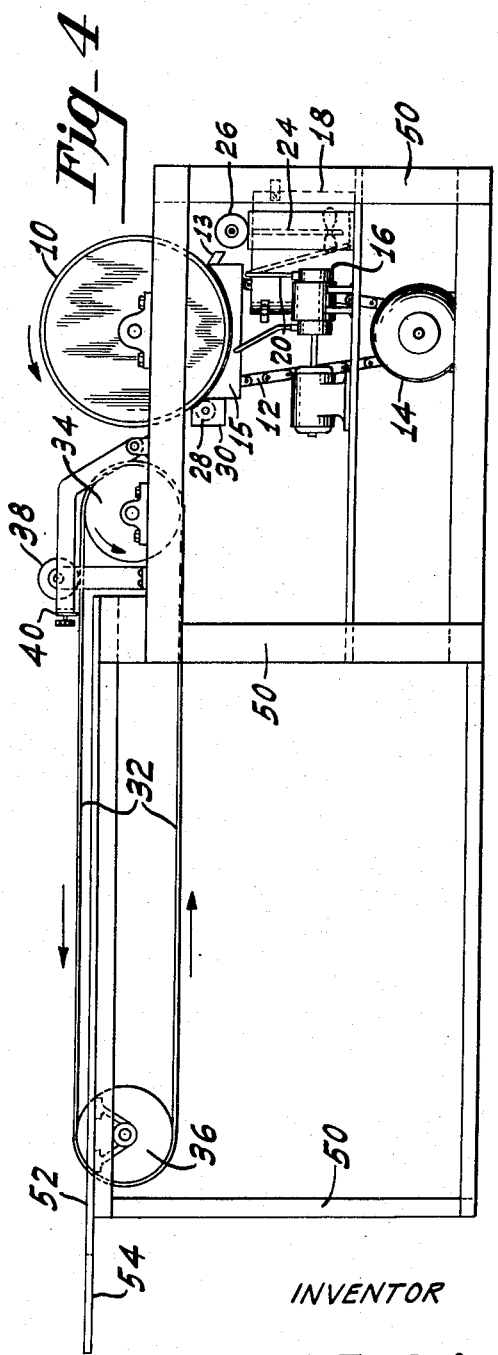
INVENTOR
*Hyman Epstein*
BY
*Charles H. Brown*
ATTORNEY Dec. 22, 1953   H. EPSTEIN   2,663,249
PANCAKE MAKING MACHINE
Filed March 22, 1951   3 Sheets-Sheet 3
*Fig. 5*
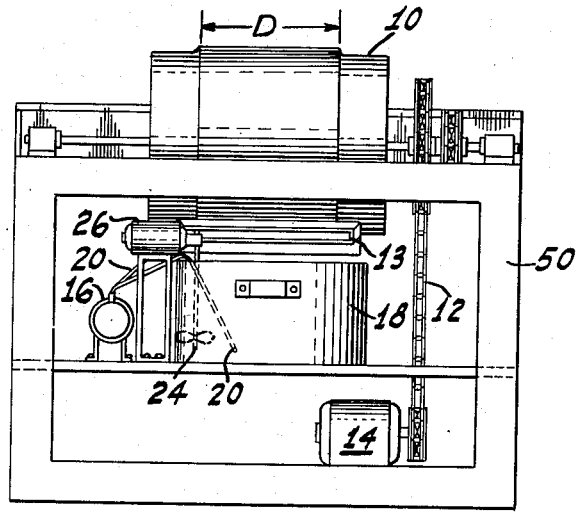
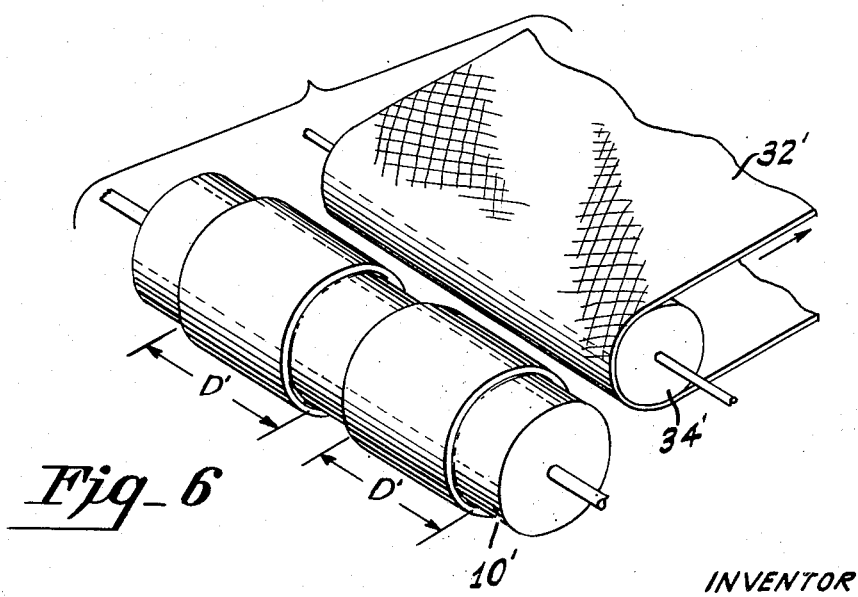
*Fig. 6*
INVENTOR
*Hyman Epstein*
BY
*Charles H. Brown*
ATTORNEY Patented Dec. 22, 1953

2,663,249

UNITED STATES PATENT OFFICE 2,663,249

PANCAKE MAKING MACHINE

Hyman Epstein, Brooklyn, N. Y., assignor of one-half to Max Levine, Brooklyn, N. Y.

Application March 22, 1951, Serial No. 216,855

5 Claims. (Cl. 99—423)

This invention relates to the preparation of pancakes from a moisture-containing batter, particularly to tissue-thin pancakes suitable for blintzes.

An object of the invention is to enable the manufacture of such pancakes practically automatically, with greater efficiency and economy than the hand operations heretofore employed, and capable of mass production.

Another object is to provide a method of and means for mechanically cooking, depositing, and slicing pancakes into uniformly thin edible products of predetermined dimensions.

A further object is to provide a machine which will transform a liquid batter into pancakes of desired thickness, deposit the same on a traveling conveyer, and cut them into a convenient size, all practically automatically, to be carried away and collected by an attendant.

Briefly, the invention comprises a heated drum rotating about a horizontal axis and passing through a pan containing the liquid batter. The heated drum collects a sufficient amount of batter on its external surface as it passes through the batter to produce a thin leaf of pancake which adheres to the drum. As the heated drum revolves, the thin leaf drops onto a conveyer belt which carries the pancake away from the drum in a continuous sheet. An oil or greasing agent is deposited on a portion of the drum prior to entry into the batter in order to prevent undue adhesion between the resulting heated pancake and the drum. A reciprocating blade located above the conveyer belt slices the continuous pancake leaf into convenient sizes. The heat of the drum is so adjusted and the speeds of travel of the drum and conveyer belt so related to each other and to the operation of the reciprocating blade as to produce a pancake of desired thinness and size.

A more detailed description of the invention follows in conjunction with a drawing, wherein:

Figs. 3 and 4 are side elevation views of Fig. 2 taken from opposite sides of the machine;

Fig. 5 is a rear elevation view of the machine of Fig. 2; and

Fig. 6 is a detail showing modifications of the drum and conveyer belt for increased mass production of pancakes.

Throughout the figures of the drawing the same parts are designated by the same reference numerals.

Figure 1:
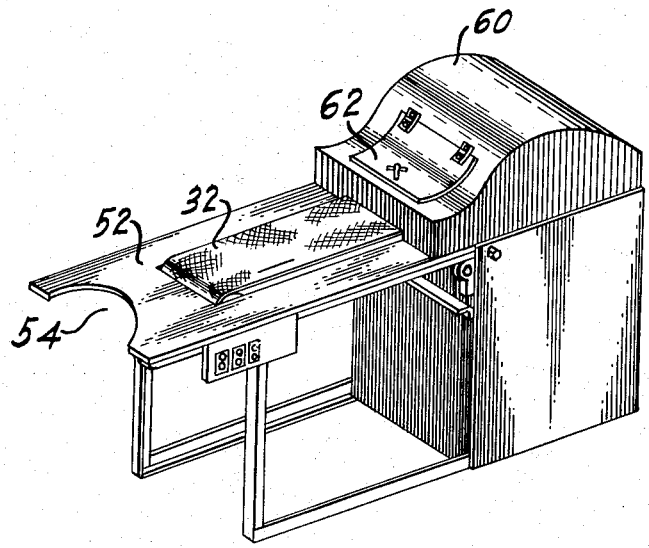
Fig. 1 is a perspective view of the machine of the invention with the drum, reciprocating blade, heating mechanism, motor and batter tanks concealed within a housing.

Referring to the drawings, the machine of the invention comprises a heated metal drum 10 arranged to rotate about a horizontal axis in the direction of the arrow, and driven by an endless belt 12 from a motor 14. The drum is heated in its interior in any suitable manner not shown, preferably electrically by a plurality of wires arranged parallel to the axis of the drum and close to the interior surface thereof. Below the drum is positioned a pan 15 into which a suitable liquid batter is pumped by pump 16 from a batter storage tank 18, via tubes 20. The batter in storage tank 18 is kept continuously agitated by a stirring rod 24 operated by a motor 26. A lip 13 on the pan serves to return to the storage tank those small increments of batter which overflow the pan 15.

Figure 2:
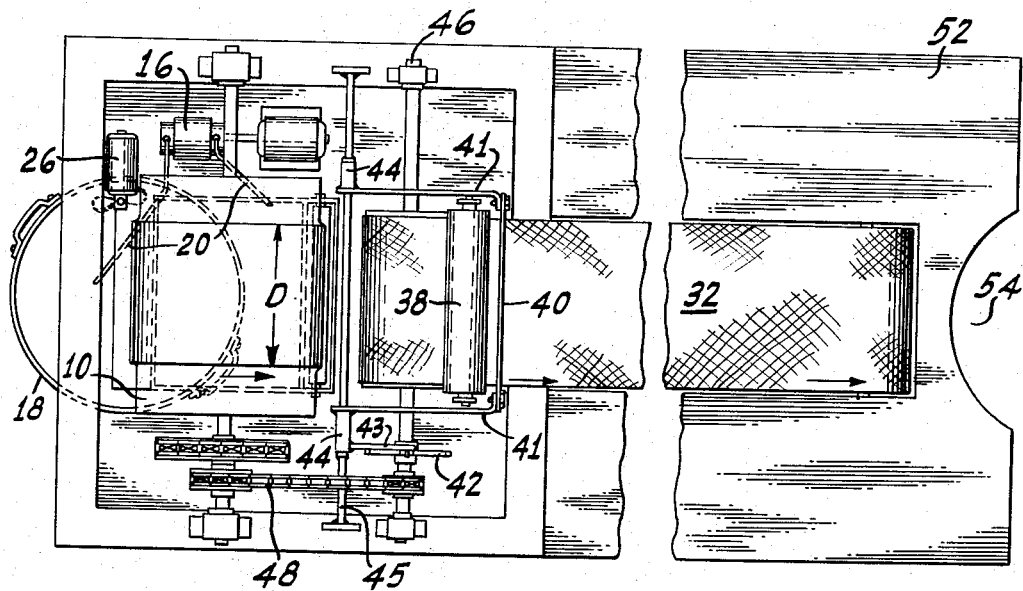
Fig. 2 is a plan view of the machine of Fig. 1 with the housing removed.

Drum 10 is provided with a raised surface represented by dimension D (note Figs. 2 and 5) which passes into pan 15 and contacts the liquid batter therein.

A roller 28 sitting in an oil storage can 30, contacts the raised portion of the drum 10 before it enters pan 15, for continuously applying oil or grease to the drum surface, to thereby prevent the heated batter from adhering too tightly to the drum. This oil in can 30 may be cottonseed oil, for example.

An endless conveyer belt 32 made up for example of canvas, is driven by pulley 34 and rides on idler pulley 36 in the direction of the arrows. A wooden idler roller 38 rests on canvas belt 32 and is adapted to lightly press upon the pancake leaf as it is continuously deposited upon the conveyer belt 32 by the heated drum 10.

A reciprocating knife blade 40 mounted transversely of the belt 32 and supported on arms 41 is intermittently raised and lowered by means of a cam 42. Cam 42 has a plurality of notches, for example four as shown, which permit an arm 43 to fall therein and be raised as the cam 42 rotates. The blade 40 is fixedly secured to arms 41, in turn, fixedly secured to sleeves 44 which are free to move about stationary bar 45. It should be noted that rotating cam 42 is mounted on the same shaft 46 which drives the conveyer belt pulley 34. Pulley 34, in turn, is driven by a chain 48 from a sprocket wheel on the shaft which drives the drum 10. It will thus be apparent that the drum 10, conveyer belt 32, and knife blade 40 are controlled by the same drive source. Their speeds of operation, however, are properly related by means of selected sprockets, wheels and cam to produce a desired rate of mass production of pancakes, coordinated with the temperature to which the drum is heated.

The machine of the invention is mounted on suitable angle iron supports 50 which support a slotted table top 52. One end of the table top 52 is indented at 54 to enable the operator to sit close to the end of the traveling conveyer belt and collect or gather in the cut pancakes as they arrive.

A housing 60 for the machine is shown in Fig. 1 to prevent dust from falling into the edible product during its process of manufacture. A door 62 in the front of the housing enables the operator to view the operation of the cutting blade and provides access thereto and to the front end of the drum 10.

In the operation of the machine, a suitable batter made, for example, from flour, eggs and water is poured into the storage tank 18 where it is continuously stirred or agitated. This batter is then sucked up into the pan 15 through the tubes 20. The raised portion D of the heated drum, as it rotates, contacts the batter in pan 15, as a result of which the batter adheres to the raised portion D and forms a leaf. This leaf is as wide as the portion D and is made to drop on the traveling conveyer belt 32 on the other side of the drum in a continuous operation. The oil in pan 15 prevents the leaf from adhering to the drum too tightly. It should be understood, however, that at the start of operations, the leaf is deposited by hand onto the traveling belt, after which the pancake leaf flows in a continuous manner over the belt 32.

It will be apparent that the thickness of the pancake leaf will depend to some extent on the temperature of the heated drum and its speed of operation, and that the size of the pancake cut by the knife blade 40 will also depend on the speed of pulley 34, the construction of the cam, and the number of its cut-out portions or notches.

In one embodiment of a machine made in accordance with the invention and as illustrated in Figs. 1 to 5, the drum 10 was heated to a temperature of 150° F. and made one complete revolution in 1½ minutes. The drum was 14½ inches wide and the raised portion D was 7 inches wide. The traveling conveyer belt was 9¾ inches wide and had an effective length of about 42 inches between pulleys (one-half overall length). The pancake leaf deposited on the canvas belt was about 1/16" thick and was cut into portions about 7½ inches long. Obviously, the temperature and speed of the drum can be varied to suit different conditions.

A modification of the details of the heated drum and the conveyer belt is shown in Fig. 6, wherein the drum 10' is shown as having two raised portions each adapted to contact liquid batter in a suitably sized pan not shown. The belt 32' is made sufficiently wide to accommodate the continuously deposited leafs from the enlarged drum. Such a modification should enable a larger mass production of pancakes.

I claim:

1. A pancake making machine comprising a single drum mounted to rotate about a horizontal axis, means for heating solely said drum in the interior thereof, a pan open at the top and positioned at the bottom of said drum so that said drum passes through the top part of said pan in its rotational path of travel, means for supplying batter to said pan for contacting said drum, a smooth conveyer belt positioned adjacent to and only on one side of another portion of said drum for collecting the pancake resulting from the heating of the batter contacting said drum and the dropping of said pancake from said drum, and means for driving said belt at a speed not in excess of the speed of said drum.

2. A pancake making machine in accordance with claim 1, including roller means engaging said drum for continuously and automatically supplying an oily substance to the entire effective surface of said drum as it rotates to prevent undue adhesion of said batter to said drum.

3. A pancake making machine in accordance with claim 1, wherein said conveyer belt is a fabric belt, there being a storage tank below the level of said drum, means including a pump for supplying batter from said storage tank to said pan, a roller contacting the exterior surface of said drum on a horizontal line in the rotational path of said drum prior to the point of contact of said drum with the batter in said pan, and another pan open at the top and mounted below said roller for supplying an oily substance to said roller to thereby prevent undue adhesion of said batter to said drum.

4. A pancake making machine in accordance with claim 1, including cam actuated cutting means mounted to one side of said drum and positioned above said conveyer belt for intermittently slicing said pancake while traveling on said conveyer belt.

5. A pancake making machine in accordance with claim 1, wherein said drum has a cylindrical raised portion symmetrically arranged intermediate both sides thereof for contacting the batter in said pan, said raised portion being the only part of said drum which contacts the batter in said pan.

HYMAN EPSTEIN.

References Cited in the file of this patent

UNITED STATES PATENTS

| Number | Name | Date |
|---|---|---|
| Re. 22,399 | Fonken | Dec. 7, 1943 |
| 623,143 | Doty | Apr. 18, 1899 |
| 871,649 | Streich | Nov. 19, 1907 |
| 1,382,926 | Mitchell | June 28, 1921 |
| 1,550,183 | Sonsthagen | Aug. 18, 1925 |
| 1,647,594 | Weaver et al. | Nov. 1, 1927 |
| 1,802,842 | Segrin | Apr. 28, 1931 |
| 2,001,116 | Smith | May 14, 1935 |

FOREIGN PATENTS

| Number | Country | Date |
|---|---|---|
| 132,148 | Great Britain | Sept. 11, 1919 |
| 764,518 | France | Mar. 5, 1934 |